(12) United States Patent
Stojkovic

(10) Patent No.: US 9,187,129 B2
(45) Date of Patent: Nov. 17, 2015

(54) VEHICLE BODY MOUNT

(71) Applicant: Ford Global Technologies, LLC, Dearborn, MI (US)

(72) Inventor: Dragan Stojkovic, Southgate, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 49 days.

(21) Appl. No.: 14/109,833

(22) Filed: Dec. 17, 2013

(65) Prior Publication Data

US 2015/0166111 A1 Jun. 18, 2015

(51) Int. Cl.
*B62D 24/00* (2006.01)
*B62D 24/02* (2006.01)
*B62D 24/04* (2006.01)
*B62D 27/06* (2006.01)

(52) U.S. Cl.
CPC .............. *B62D 24/02* (2013.01); *B62D 24/04* (2013.01); *B62D 27/06* (2013.01)

(58) Field of Classification Search
CPC ......... B62D 27/06; B62D 24/02; B62D 24/04
USPC .................................................. 296/35.1, 191
See application file for complete search history.

(56) References Cited

U.S. PATENT DOCUMENTS

| 5,848,469 | A | * | 12/1998 | O'Connor et al. ........... 29/897.2 |
| 6,068,330 | A | | 5/2000 | Kasuga et al. |
| 6,255,631 | B1 | * | 7/2001 | Kichline et al. .............. 219/617 |
| 7,399,015 | B2 | | 7/2008 | Patel et al. |
| 7,771,137 | B2 | | 8/2010 | Anzai et al. |

FOREIGN PATENT DOCUMENTS

KR 20120060654 A 6/2012

* cited by examiner

*Primary Examiner* — Joseph D Pape
*Assistant Examiner* — Dana Ivey
(74) *Attorney, Agent, or Firm* — Jason C. Rogers; Bejin Bieneman PLC

(57) ABSTRACT

A body frame for mounting to a base frame of a vehicle includes a body mount assembly including an aluminum, tubular cross member having an inner passage and an aluminum collar support received in the inner passage for supporting the tubular cross member once it is coupled to the base frame of the vehicle. The collar support member has a multi-hollows design including an inner and outer, cylindrically-shaped portions and a plurality of equi-angularly spaced, radially extending walls interconnecting the inner and outer portions for providing the body mount the required flexibility during assembly and the required structural support and performance during vehicle use.

19 Claims, 4 Drawing Sheets

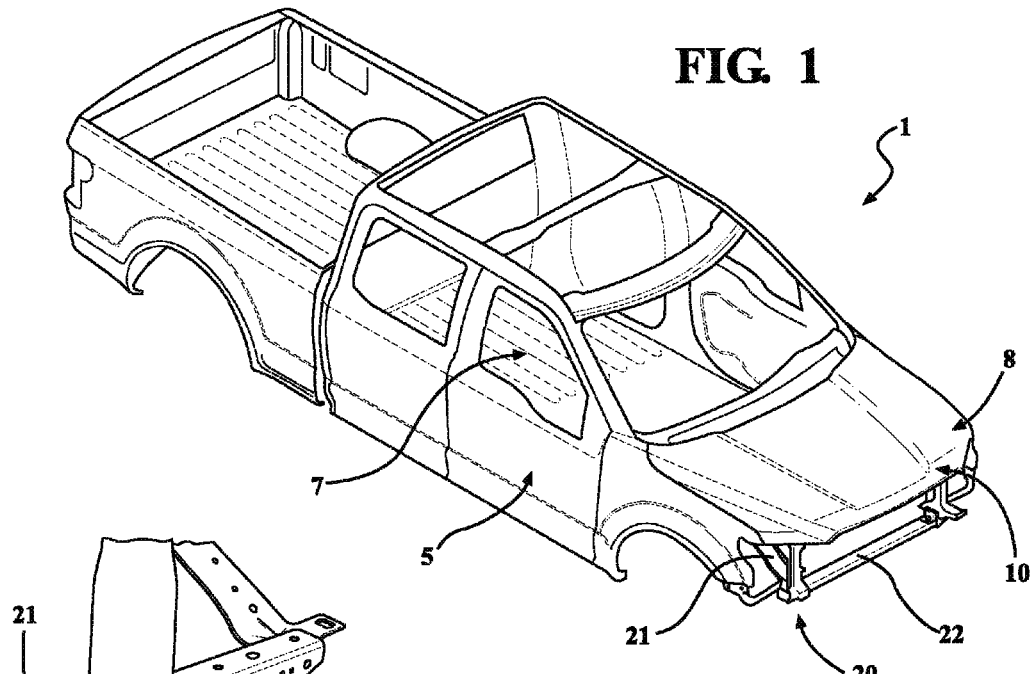
FIG. 1
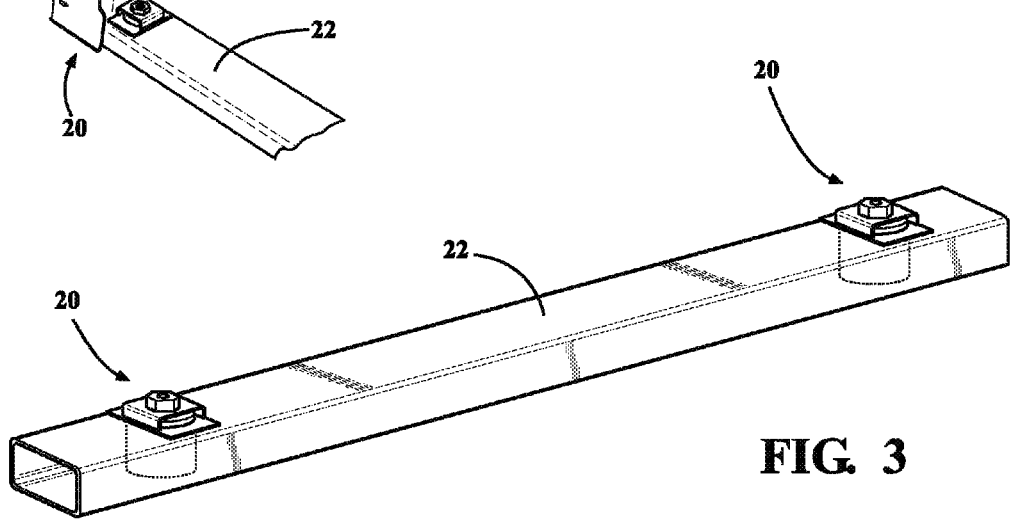
FIG. 2
FIG. 3

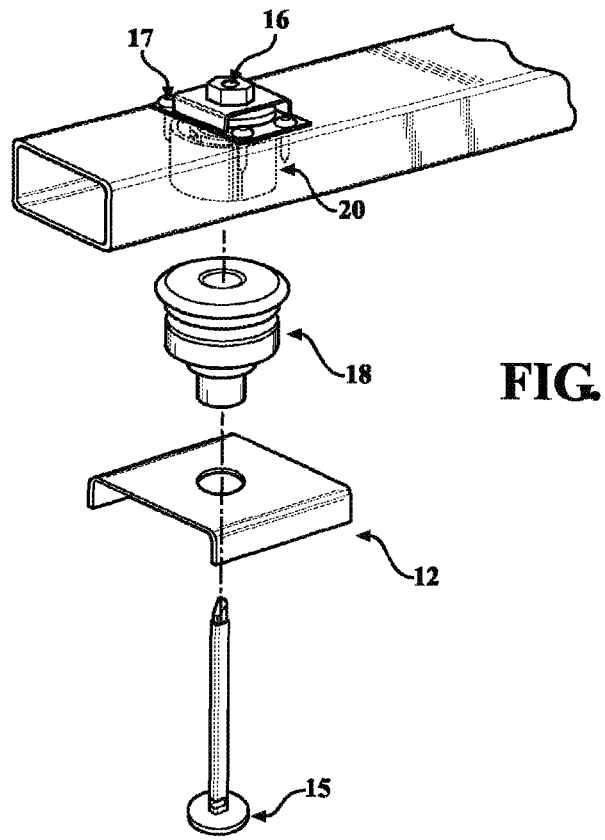
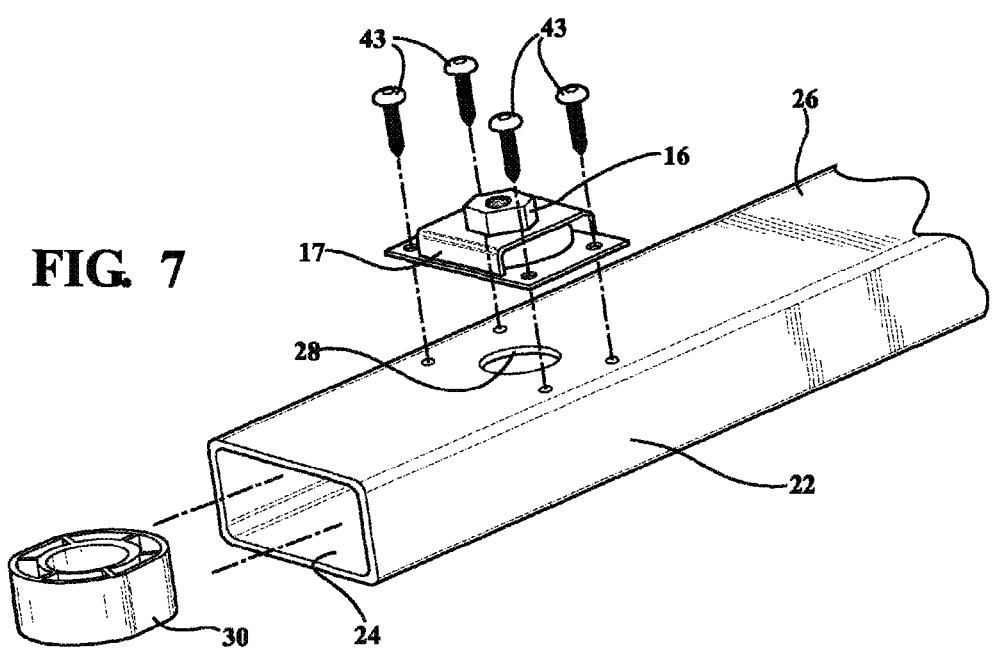

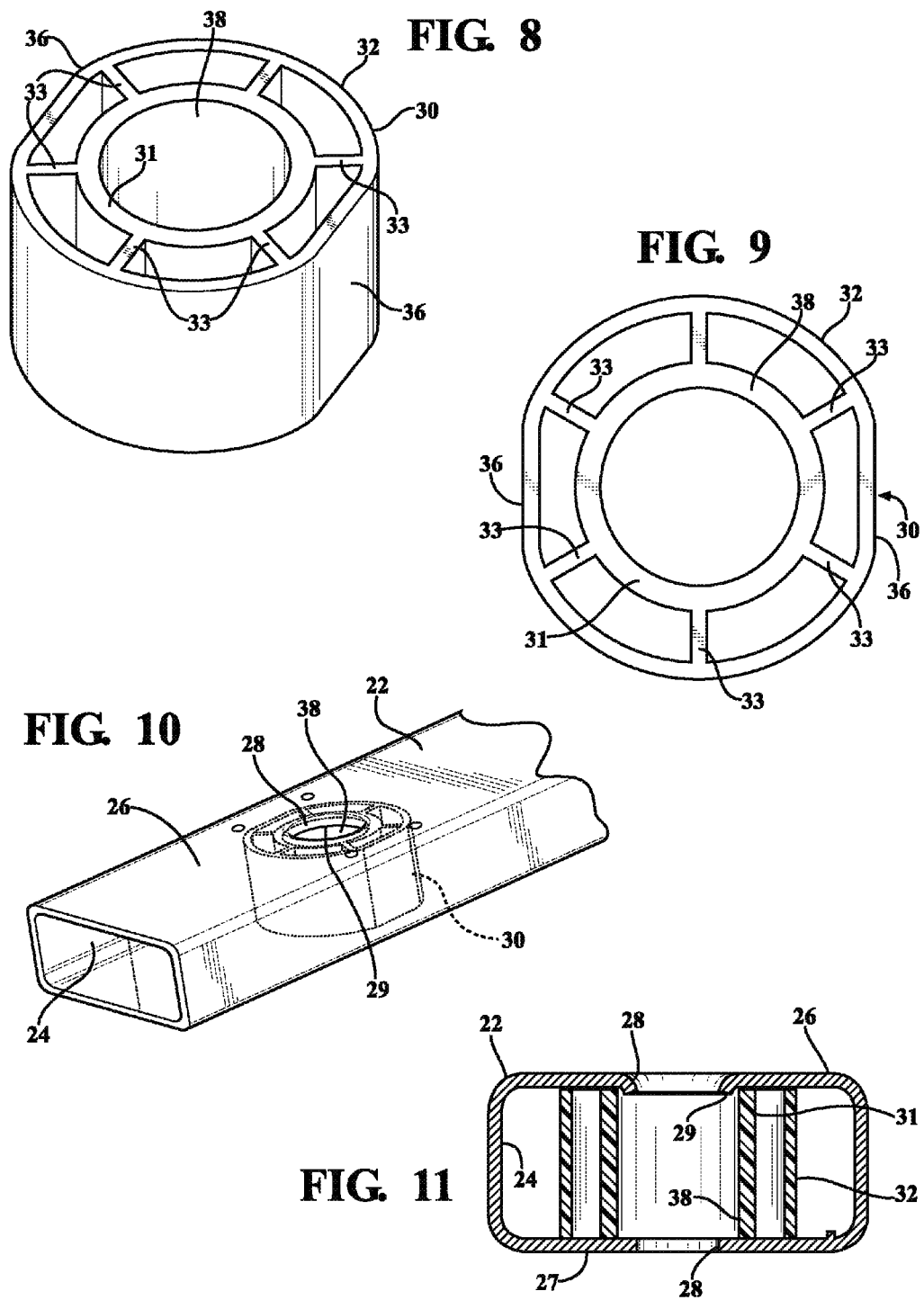

VEHICLE BODY MOUNT

BACKGROUND

The present disclosure generally relates to vehicles and, more particularly, relates to an aluminum body mount support for an aluminum frame that better accommodates build variation and meets the required strength and performance requirements while being more cost and mass efficient.

Generally, it is known to use a vehicle body mount structure for coupling a body of the vehicle to a frame. It is generally known to use a connecting structure including a hollow member or a half-hollow member for coupling or mounting a vehicle body to a frame. In one example of a known vehicle body mount, a bolt and a nut are used for fixing or coupling the hollow member to a cross frame member to form a vehicle body mount. In one generally known construction of such a vehicle body mount formed using steel materials, a generally round tubular collar is located within a generally hollow, square cross-section, tubular cross member including holes aligned with the collar for receiving the bolt there through and forming the vehicle body mount. The collar of the vehicle body mount is used to transfer forces between the sides of the hollow, square tubular cross-section cross member. While such a steel material vehicle body mount or coupling is known, an attempt to use the same construction in an aluminum material has proven not possible as the vehicle body mount fails to perform its required functions and to meet required testing performance criteria.

DRAWINGS

FIG. 1 is a perspective graphic view of a vehicle including a front vehicle body mount assembly according to an exemplary embodiment of the present disclosure.

FIG. 2 is partial, perspective graphic view of a sub-assembly of the vehicle showing the front vehicle body mount assembly according to an exemplary embodiment of the present disclosure.

FIG. 3 is a perspective graphic view of a hollow, tubular member including the body mount assembly according to the exemplary embodiment of the present disclosure.

FIG. 6, is a partial, exploded, perspective view of the body mount assembly of FIG. 3.

FIG. 7, is an alternate partial, exploded, perspective view of the body mount assembly of FIG. 6.

FIG. 8, is a perspective view of a collar of the body mount assembly of FIG. 3.

FIG. 9, is a top, plan view of the collar of FIG. 8.

FIG. 10, is an alternate partial, perspective view of the collar installed in the hollow, tubular member of the body mount assembly according to an exemplary embodiment of the present disclosure.

FIG. 11, is a cross-section of the partial body mount assembly of FIG. 10 taken along the line 11-11.

DETAILED DESCRIPTION

Figure 4:
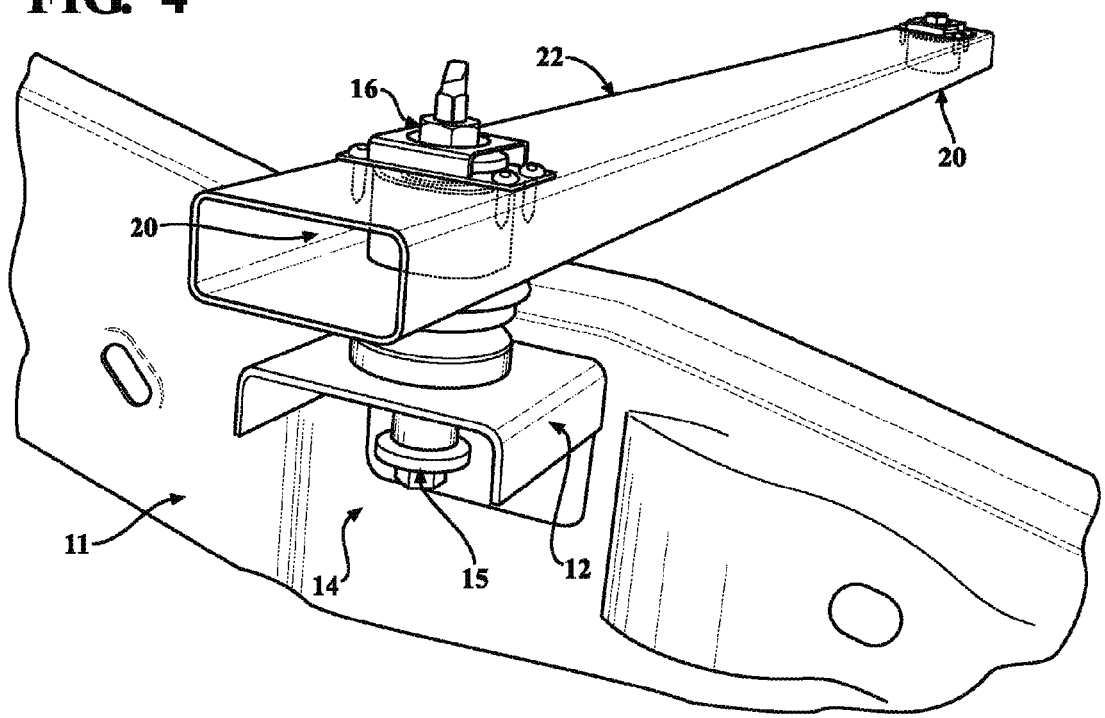
FIG. 4 is a partial, perspective graphic view of body mount assembly coupled to the vehicle frame rail according to the exemplary embodiment of the present disclosure.

Referring in general to all of the Figures and in particular to FIGS. 1 through 7 there is disclosed an exemplary embodiment of a vehicle body mount 20 for mounting and supporting a vehicle body 1 including a front end vehicle body frame 8 to a vehicle base frame 11. The vehicle body mount 20 provides an attachment point that may better accommodate vehicle body 1 build variations while still providing the required performance criteria including support and crush resistance for an aluminum vehicle body frame 8. The vehicle body mount 20 may be a through bolted type body mount joint including a crush tube or cross member 22 made from an aluminum material. The cross member 22 may maintain the required vehicle body mount joint stiffness under a variety of vehicle body 1 build variations and cage nut positions. In one exemplary embodiment of the present disclosure, the vehicle body 1 may include a cab 5 including an occupant or passenger compartment 7 and a front deck or hood 10 and other standard vehicle components, systems and assemblies. While the exemplary embodiment of the present disclosure relates to a pickup type vehicle body 1 as disclosed, it should be understood that it is possible that the body mount 20 of the exemplary embodiments of the present disclosure may be used with any type of vehicle including, but not limited to, sedans, crossover, utility and others. With particular reference to FIG. 4, the vehicle may further include a vehicle base frame 11 including a frame support or member 12. The frame support 12 extends laterally from the base frame 11.

The vehicle body 1 of the exemplary embodiment of the present disclosure may further include a vehicle body frame 21 including a tubular cross frame or member 22 preferably made from an aluminum material. The cross frame member 22 may preferably have a generally rectangularly shaped cross section. The cross member 22 generally supports the vehicle body 1 on the base frame 11 by coupling the vehicle body 1 to the frame supports 12 as shown for the right-hand side of the vehicle base frame 11. As best shown in FIG. 3, the vehicle body 1 of the exemplary embodiment of the present disclosure may further include two body mounts 20 located proximal the ends of the cross frame member 22 of the vehicle body frame 21.

Figure 5:
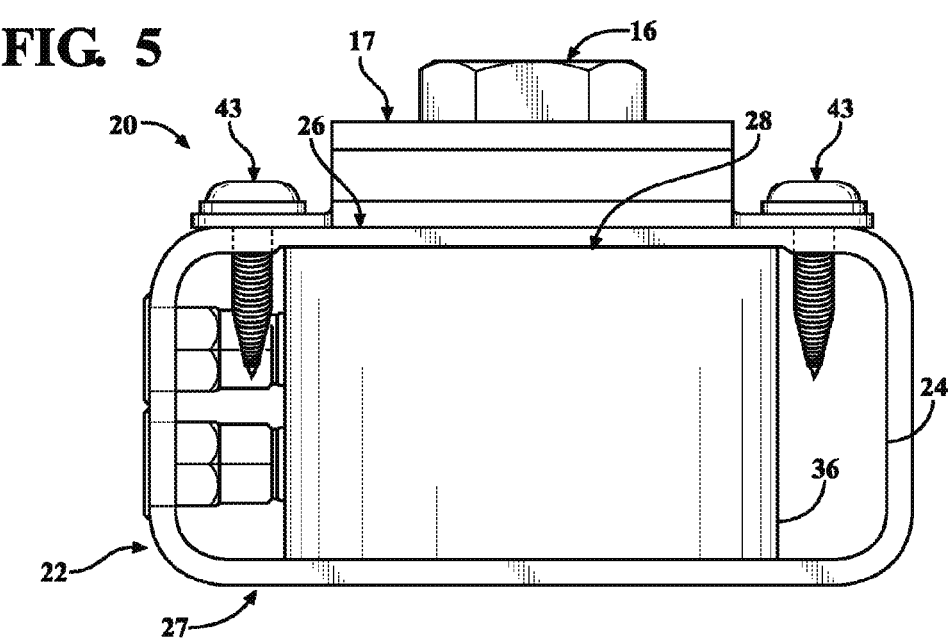
FIG. 5 is a partial, end, plan view of the body mount assembly of FIG. 4.

The cross member 22 may preferably be coupled to the frame support 12 using a fastener 14 or other coupling mechanism. In the exemplary embodiment of the present disclosure, the fastener 14 may preferably include a bolt 15 and a nut 16 coupled to the cross member 22 using a cage 17. The cage 17 may preferably be coupled or fastened to the cross member 22 using a plurality of threaded bolts or fasteners 43 as best shown in FIGS. 5 and 7. The cross member 22 may be coupled to the frame supports 12 and include a traditional isolator support or bushing 18.

The tubular cross member 22 of the exemplary embodiment may preferably further include an inner passage 24 having a generally rectangular shaped cross-section. Further the cross member 22 may include a top surface 26 and a bottom surface 27 each including a set of holes 28 located proximal the ends of the cross member 22. Each pair of holes 28 may preferably be aligned as best shown in FIG. 7. In one particular exemplary embodiment of the present disclosure, the hole or passage 28 in the top surface 26 of the cross member 22 may preferably be formed to include an angled lip 29 for engaging in inner passage of a multi-hollow collar insert or support 30.

Referring now also to FIGS. 8 through 11, greater detail of the collar support 30 may be understood. In particular, FIG. 11 further details how the lip 29 of the hole 28 of the upper surface 26 of the cross member 22 is angled or formed to engage an inner passage 38 of the multi-hollow collar support 30 to couple or retain the collar supports 30 within the inner passage 24 of the cross member 22. In an exemplary embodiment of the present disclosure, the multi-hollow collar support 30 may include an inner cylindrical shaped support or member 31 defining the inner passage 38. The inner support 31 of the collar support 30 may preferably have a circular cross-section defining a center point or axis for receiving the bolt 15 there through. The center of or axis of the inner support 31 may preferably be aligned with the center or axis of the hole 28 in the upper surface 26 of the cross member 22. In one particular exemplary embodiment of the present disclosure, the angled portion or lip 29 of the whole 28 is preferably formed to allow the collar support 30 retain some minimal freedom of movement within the inner passage 24 of the cross member 22 to allow for variations in the building of the vehicle body 1 to be mounted on the frame support 12.

The collar support 30 may further include and outer cylindrically shaped outer member 32 generally having a circular cross-section defining a center or axis aligned with the center or axis of the inner support 31. The collar supports 30 further include a plurality of radially extending walls 33 extending between an outer surface of the inner member 31 and an inner surface of the outer member 32 to define the multi-hollows 34 of the collar member 30. The walls 33 are preferably spaced equal angularly about the center of the inner and outer supports 31 and 32, respectively, of the collar support 30. In the particular exemplary embodiment of the present disclosure, the collar support 30 includes six walls 33. Accordingly, in the present embodiment the walls 33 are spaced 60° apart. It should be understood that it is possible to include fewer or greater numbers of walls 33.

In one exemplary embodiment of the present disclosure, the outer support 32 of the collar support 30 includes a pair of flat straight surfaces 36 on the outer surface thereof. The flat surfaces 36 are preferably located opposite each other as best shown in FIGS. 5 and 9. The flat surfaces 36 provide additional space between the collar support 30 and the inner wall of the inner passage 24 of the cross support 22. The additional space between the collar support 30 and the inner wall of the inner passage 24 of the cross member 22 has particular utility for allowing and automated insertion of the collar support 30 in the inner passage 24 of the cross member 22 as well as during formation of the lip or end 29 of the hole 28 in the upper surface 26 of the cross member 22.

The collar support 30 is preferably made from an aluminum material and provides significant weight and cost reductions due to the multi-hollows design. Surprisingly, the collar support 30 of the exemplary embodiment of the present disclosure provides the above features while unexpectedly also providing increased performance and improved noise and vibration and harshness (NVH) measurements.

It is understood that the present description is intended to be illustrative and not restrictive. Many embodiments as well as many applications besides the examples provided will be apparent to those of skill in the art upon understanding the present disclosure. The scope of the claimed invention should, therefore, not be determined with limiting reference to the description, but should instead be determined with reference to the appended claims, along with the full scope of equivalents to which such claims are entitled. Any disclosure of an article or reference, including patent applications and publications, is incorporated by reference herein for all purposes. Any omission in the following claims of any aspect of subject matter disclosed herein is not a disclaimer of such subject matter.

It is understood that any numerical values recited herein or in the figures are intended to include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc, are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. Unless expressly stated, all ranges are intended to include both endpoints and all numbers between the endpoints. The use of "generally," "about" or "approximately", or similar words, in connection with a range applies to both ends of the range. Thus, "about 20 to 30" is intended to cover "about 20 to about 30", inclusive of at least the specified endpoints.

It is understood that the use of the term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein are open ended and also contemplate embodiments that consist essentially of the elements, ingredients, components or steps. By use of the term "may" herein, it is intended that any described attributes that "may" be included are optional unless otherwise stated.

The disclosure of "a" or "one" to describe an element, ingredient, component or step is not intended to foreclose additional elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps.

I claim:

1. A body mount assembly for use in coupling a cab to a frame of a vehicle, the body mount assembly comprising:
   a cross member comprising aluminum and having a longitudinal axis and a rectangular cross-section generally perpendicular to the longitudinal axis and defining an inner passage, the cross member including a first outer surface portion and a second oppositely disposed outer surface portion, wherein each of the first surface portion and the second surface portion respectively include first and second openings that are aligned with one another, further wherein each of the first and second openings is in communication with the inner passage; and
   a collar comprising aluminum and having an inner, generally cylindrically shaped portion defining a center axis and a first collar passage that includes the center axis, the collar further having an outer portion also defining the center axis, the collar further including a plurality of walls interconnecting the inner portion and the outer portion,
   wherein the collar is located in the inner passage of the cross member and the first collar passage aligned with the first and second surface openings of the first and second cross member surface openings.

2. The body mount assembly of claim 1, further comprising a bolt located in the openings of the first and second surface portions of the cross member and the inner passage of the collar.

3. The body mount assembly of claim 1, wherein the plurality of walls of the collar comprises six walls, each of the walls interconnecting the inner portion and the outer portion.

4. The body mount assembly of claim 3, wherein the six walls of the collar are located equi-angularly about the center axis.

5. The body mount assembly of claim 1, wherein the first opening of the cross member is angled toward the collar with respect to the first surface portion and at least partially contacts the inner passage of the collar and generally maintains the collar in the inner passage of cross member.

6. The body mount assembly of claim 1, wherein the first passage of the cross member is angled toward the collar with respect to the first surface portion and at least partially contacts the inner passage of the collar and generally maintains the collar in the inner passage of cross member such that the aluminum collar and cross member have a greater stiffness for the body mount assembly over a larger area while reducing the overall mass of the body mount assembly.

7. The body mount assembly of claim 1, wherein the outer portion of the collar includes at least a first segment that is generally flat and a second segment that is curved.

8. The body mount assembly of claim 1, wherein the outer portion of the collar includes at least a first segment and a second segment, the first segment being a first radial distance from the inner portion with respect to the central axis, and the second segment being a second radial distance from the inner portion with respect to the central axis.

9. The body mount assembly of claim 1, wherein the central axis and the longitudinal axis are generally perpendicular to each other.

10. An aluminum body mount assembly for use in coupling a body frame to a base frame of a vehicle, the aluminum body mount assembly comprising:
a cross member having a first end, a second end defining a longitudinal axis and a rectangular cross-section generally perpendicular to the longitudinal axis and including an inner passage, the cross member including a first outer surface portion and a second oppositely disposed outer surface portion and wherein each of the first surface portion and the second surface portion include respective first and second aligned openings located proximal the first end and in communication with the inner passage; and
a collar support having an inner, generally cylindrically shaped portion defining a center axis and a first collar support passage that includes the center axis, the collar support further having an outer portion also defining the center axis, the collar support further including a plurality of walls interconnecting the inner portion and the outer portion,
wherein the collar support is located in the inner passage of the cross member and the first collar support passage aligned with the first and second surface openings of the first and second cross member surface openings.

11. The body mount assembly of claim 10, wherein each of the first surface portion and the second surface portion of the cross member further include aligned third and fourth openings located proximal to the second end and in communication with the inner passage, and the body mount assembly further comprises a second collar support having an inner, generally cylindrically shaped portion defining a second collar support center axis and a first passage of the second collar support, the second collar support further having an outer portion defining the center axis and a plurality of walls interconnecting the inner portion and the outer portion of the second collar, and wherein the second collar support is located in the inner passage of the generally tubular cross member and the first passage of the second collar support is aligned with the third and fourth openings of the first and second surface portions of the cross member.

12. The body mount assembly of claim 11, further comprising a second bolt located in the respective second passages of the first and second surface portions of the cross member and the inner passage of the second collar support.

13. The body mount assembly of claim 11, wherein the plurality of walls of the second collar support comprises six walls interconnecting the inner portion and the outer portion.

14. The body mount assembly of claim 13, wherein the six walls of the second collar support are located equi-angularly about the center axis of the second collar support.

15. The body mount assembly of claim 11, wherein the first and third openings of the cross member are angled toward the collar support and the second collar support with respect to the first surface portion of the cross member, and each angled portion at least partially contacts the passages of the collar support and second collar support and generally maintains the collar support and the second collar support in the inner passage of cross member.

16. The body mount assembly of claim 11, wherein the respective outer portions of each of the first and second collar supports includes at least a first segment that is generally flat and a second segment that is curved.

17. The body mount assembly of claim 11, wherein the respective outer portions of each of the first and second collar supports includes at least respective first segments and second segments, the first segments being a first radial distance from the respective inner portion with respect to the respective central axis, and the second segment being a second radial distance from the respective inner portion with respect to the respective central axis.

18. The body mount assembly of claim 11, wherein the central axes are each generally perpendicular to the longitudinal axis.

19. The body mount assembly of claim 10, wherein the outer portion of the collar support includes oppositely located flat portions.

* * * * *